United States Patent [19]

Gant

[11] Patent Number: 4,533,183
[45] Date of Patent: Aug. 6, 1985

[54] MILITARY WHEEL-TIRE ASSEMBLY

[75] Inventor: Lawrence A. Gant, Wayne, Mich.

[73] Assignee: The United States of America as represented by the Secretary of the Army, Washington, D.C.

[21] Appl. No.: 533,078

[22] Filed: Sep. 19, 1983

[51] Int. Cl.³ .................. B60B 7/00; B60B 15/06
[52] U.S. Cl. .................. 301/37 TC; 301/45; 280/160
[58] Field of Search .......... 301/37 R, 41 R, 43, 301/45, 46, 39 T, 47, 37 ST, 37 T, 37 TC; 152/152, 155, DIG. 12, 353 R; 280/156, 160; 89/36 H, 40 B

[56] References Cited

U.S. PATENT DOCUMENTS

| | | | |
|---|---|---|---|
| 1,865,882 | 7/1932 | Palmer | 89/40 B |
| 2,108,346 | 2/1938 | Paul | 301/41 R |
| 2,377,195 | 5/1945 | Van De Hey | 301/45 |
| 2,986,189 | 5/1961 | Lindley | 152/158 |
| 3,179,553 | 4/1965 | Franklin | 161/183 |
| 3,347,300 | 10/1967 | Sidles | 152/352 |
| 3,394,751 | 7/1968 | Sidles et al. | 152/330 |
| 3,400,746 | 9/1968 | Heimovics, Jr. | 152/330 |
| 3,962,976 | 6/1976 | Kelsey | 109/82 |
| 4,212,339 | 7/1980 | Dobson | 152/158 |
| 4,216,809 | 8/1980 | Pixley | 152/158 |

FOREIGN PATENT DOCUMENTS

401345  7/1932  United Kingdom ........... 301/37 ST

Primary Examiner—David A. Scherbel
Assistant Examiner—Mark J. Abate
Attorney, Agent, or Firm—Peter A. Taucher; John E. McRae; Robert P. Gibson

[57] ABSTRACT

A mechanism for protecting the tires of military vehicles from destruction by enemy small arms fire. The mechanism includes a plate or disk of armor material radiating from the vehicle wheel to a point slightly less than the expected radial deformation of the tire so that the disk is prevented from impacting against the terrain during severe jounce motions of the tire. As an auxiliary feature, a series of paddles can be retractably mounted on each disk for extension from the disk preferably when it is desired to operate the vehicle in mud, sand, or other soft terrains. The paddles tractively engaged the terrain to prevent wheel spin.

1 Claim, 9 Drawing Figures

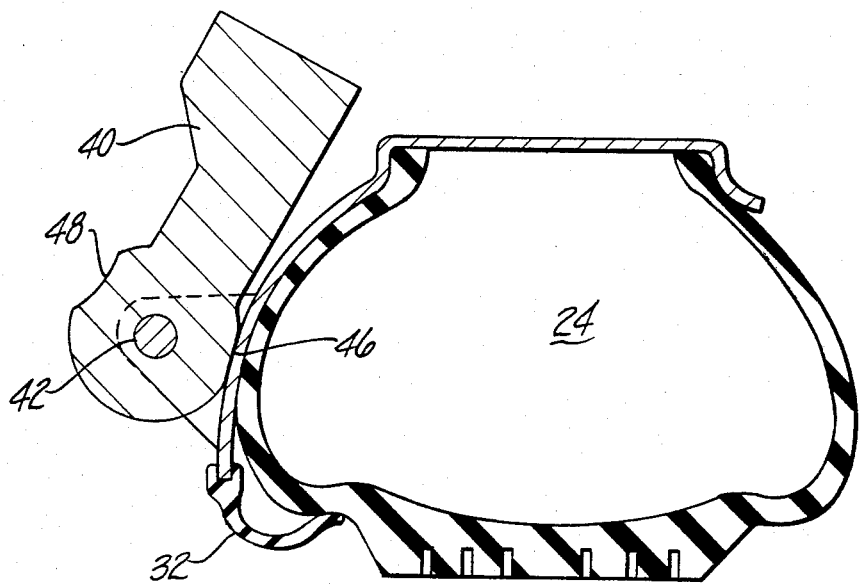
Fig-4
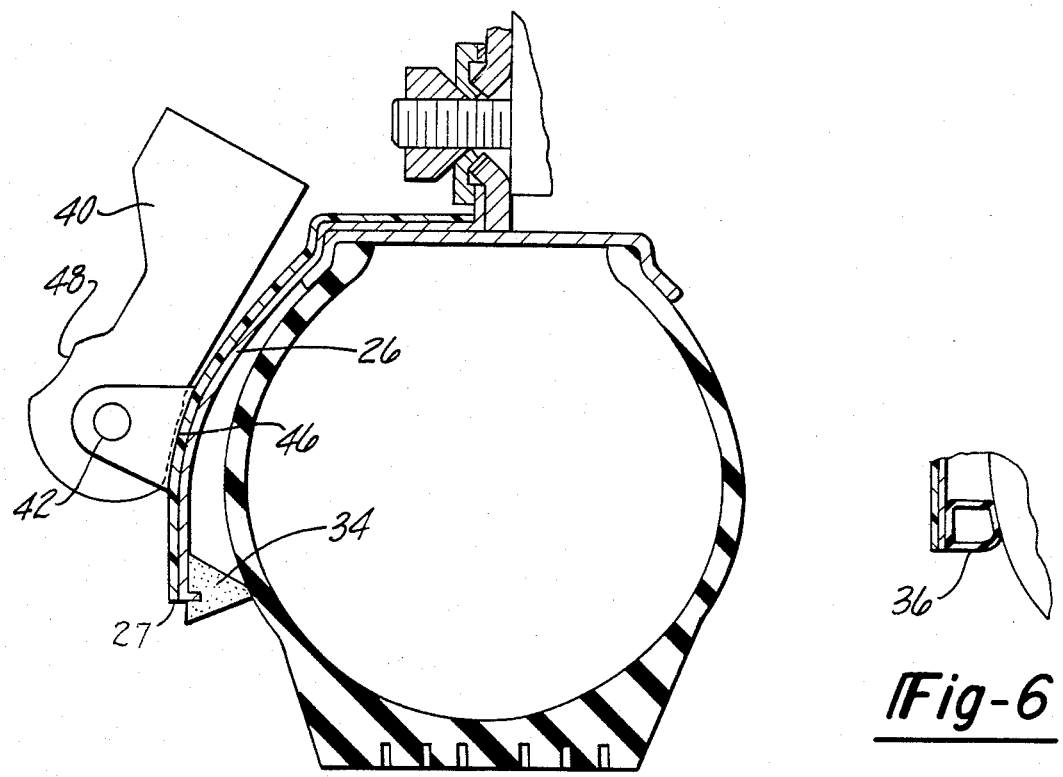
Fig-5
Fig-6

MILITARY WHEEL-TIRE ASSEMBLY

GOVERNMENT INTEREST

The invention described herein may be manufactured, used, and licensed by or for the Government for governmental purposes without payment to me of any royalty thereon.

SUMMARY OF THE INVENTION

This invention relates primarily to a mechanism for protecting the tires of military vehicles from destruction by enemy small arms fire. The mechanism comprises a disk or plate secured to the outer rim of each wheel to reduce tire sidewall areas visible to enemy forces located to the left or right of the vehicle. Each plate is formed of armor material (e.g. hardened steel plate or laminated composite materials).

As a secondary feature of the invention, each armor plate can be equipped with a number of retractible paddles evenly-spaced around the plate circumference. With the paddles extended radially outwardly beyond the peripheral edge of the plate the paddles are tractively engageable with the terrain to minimize or eliminate tire slippage; the paddles are used in their extended conditions only when the vehicle is proceeding through soft terrain, e.g. mud, sand or snow. When the vehicle is traversing hard terrain (e.g. rocky terrain, dry packed soil, or pavement) the paddles are retracted to locations within the rotational envelope of the armor plate.

IN THE DRAWINGS

FIG. 4 is a view similar to FIG. 2, but showing the tire in a heavily loaded condition, or partially deflated (by lowering the tire pressure to provide greater traction).

FIG. 5 is a view similar to FIG. 1 but illustrating a second embodiment of the invention.

FIG. 6 is a fragmentary sectional view illustrating a seal structure that can be used in practice of the invention.

Figure 1:
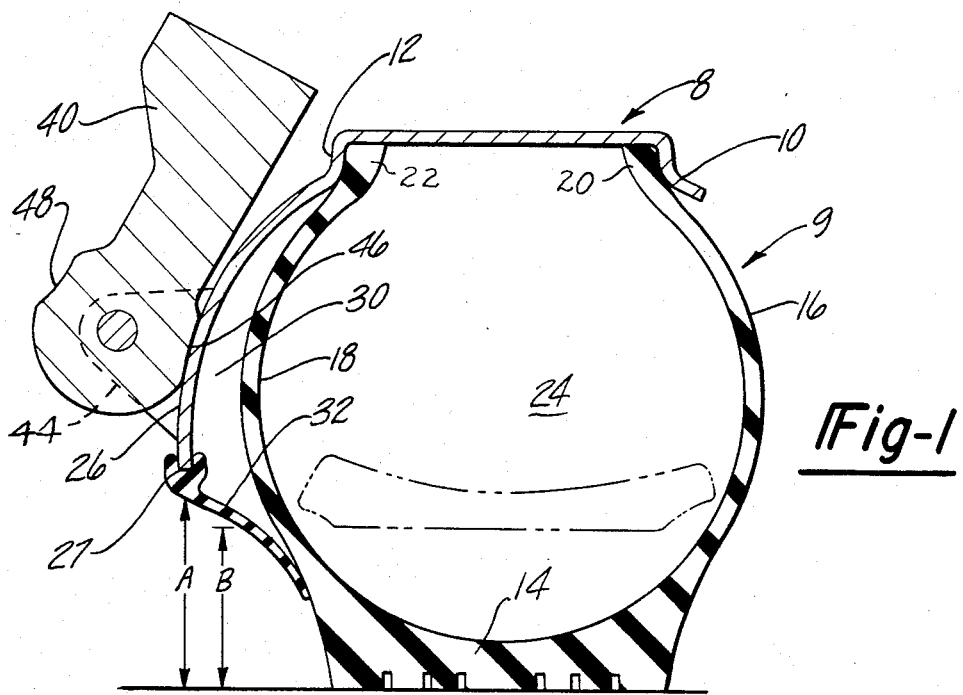
FIG. 1 is a cross-sectional view through a wheel-tire assembly embodying the invention.
Figures 2, 3:
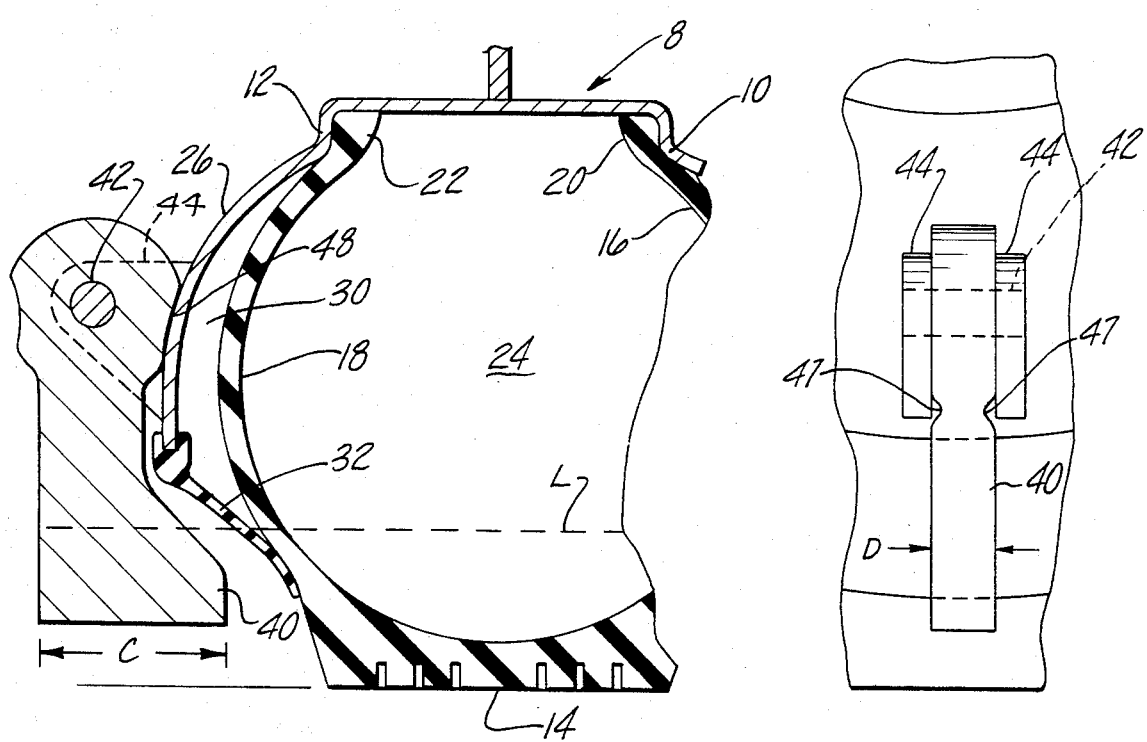
FIG. 2 is a view similar to FIG. 1, but illustrating a paddle structure in its extended position.
FIG. 3 is a fragmentary left side view of the FIG. 1 structure.

Referring more particularly to FIGS. 1 and 2, there is shown an annular wheel-tire assembly for a military vehicle. Wheel 8 includes an inner-located rim flange 10 facing the vehicle centerline, and an outer-located rim flange 12 facing the area alongside the vehicle. Tire 9 includes a tread wall 14, spaced sidewalls 16 and 18, and two beads 20 and 22 adapted to fit against the facing surfaces of the wheel rim flanges 10 and 12. Interior space 24 is pressurized. The tire may be of conventional construction, i.e. reinforced with cords (not shown).

Under my invention outer rim flange 12 of the wheel carries a bullet-interception wall or disk 26, said wall extending radially outwardly from the wheel to partially conceal the tire outer sidewall 18 from enemy forces located leftwardly of the vehicle. The wheels on the right side of the vehicle would have similar bullet-interception walls partially concealing the tire outer sidewall from enemy forces in the area to the right of the vehicle. Walls 26 would be formed of hardened steel or other material having armor capabilities, e.g. the materials described in U.S. Pat. Nos. 3,179,553 and 3,962,976.

FIGS. 1 and 2 show wall 26 as an integral extension of wheel rim flange 12. FIG. 5 shows an alternate arrangement wherein the bullet-interception wall is separately formed from the wheel. The concept of FIG. 5 is to provide add-on armor capability to an existing conventional wheel; the composite materials and wall thicknesses for the armor can be different than the materials and wall thicknesses for the wheel.

Wall 26 includes an outer peripheral edge 27 of circular contour, said edge 27 being spaced radially inwardly from the plane of tire tread wall 14 by a distance A that is somewhat greater than the expected radial deflection B of the tread wall, whereby wall 26 is prevented from impacting against the terrain during jounce motion of the wheel.

The primary reason for placing armor wall 26 on the wheel rather than on the fender of the vehicle is that under severe jounce conditions the vehicle ground clearance is relatively small; if the vehicle fenders were provided with armor skirts having a ground clearance dimension A (FIG. 1) the armor skirts would be apt to impact the ground surface during severe jounce motions of the wheel-tire assembly.

Conventional tires tend to expand laterally when heavily loaded (FIG. 4). Therefore, armor wall 26 is made to diverge away from the tire sidewall in a direction measured from wheel rim flange 12 to the tire tread wall 14. This lateral divergence of wall 26 provides a free space 30 sufficient to accommodate lateral flexure of tire sidewall 18 from the normal condition (FIG. 1) to the heavily loaded condition (FIG. 4). The aim is to provide the armor protection without restraining normal flexure of the tire.

There is a possibility that during off-road operations the free space 30 between wall 26 and the tire sidewall could collect debris such as twigs, grass, stones, mud, sand, etc. Debris packed into space 30 could interfere with normal tire flexure. Some type of seal is preferably provided between wall 26 and the tire sidewall. As shown in FIG. 1, the seal comprises an annular flexible strip 32 having a U-shaped groove in its inner edge for securement of the sealing strip to the peripheral edge of wall 26. The outer edge area of strip 32 is adhesively secured or bonded to the tire surface. In FIG. 5 the annular seal comprises an annular block of foam rubber 34 bonded to the inner surface of wall 26; the foam rubber block is easily compressed by the tire sidewall to thus maintain a seal without interference with normal tire flexure. In FIG. 6 the seal comprises a hollow annular rubber gasket 36 secured to the inner surface of wall 26; gasket 36 would be similar to gasket structures commonly used on refrigerator doors.

During off-road operations in soft soils (mud, snow or sand) the tires are prone to slip and spin in the soft terrain. FIGS. 1 and 2 show paddle means for reducing or completely eliminating the wheel spinning action, at least under some conditions. The paddle means preferably includes a number of separate paddles 40 evenly spaced around the circumference of wall 26. For example, there could be twelve such paddles spaced thirty degrees apart; each paddle is radially oriented. The optimum number of paddles would have to be determined according to paddle size and trial-error experimentation.

Each paddle 40 is swingable on a pin 42 extending between two ears 44 carried by armor wall 26; by constructing the pins as removable components it would be possible to remove and store the paddles when they are not needed. Two flat spots (or reversely curved areas) 46 and 48 are provided on the paddle edge surface for alternate engagement against wall 26 to detain the paddle in its retracted position (FIG. 1) or its extended position (FIG. 2). In its retracted position each paddle is within the rotational envelope of wall 26, hence inactive for tractive purposes. In its extended position (FIG. 2) each paddle extends radially beyond the annular wall rotational envelope for exerting a tractive force on soft terrain after sinkage of the tire into the terrain.

When it is desired to operate the vehicle on hard terrain paddles 40 are manually swung to the retracted positions within the rotational envelope of wall 26. Prior to operation of the vehicle in soft terrain the paddles 40 are swung outwardly to the FIG. 2 extended positions. The swing arc (between the FIG. 1 and FIG. 2 positions) is preferably something in excess of one hundred eighty degrees, such that wheel rotation tends to maintain each paddle in its adjusted position. In the FIG. 1 position centrifugal force tends to swing the paddle clockwise, i.e. into tighter engagement with wall 26. In the FIG. 2 position centrifugal force tends to keep the paddle extended.

With the paddles in their FIG. 2 extended positions they can augment the tractive forces generated by the tire. As the tire sinks into the terrain toward level L the paddles enter the terrain surface and exert tractive forces thereon. The paddles are preferably constructed with their width dimensions C significantly greater than their thickness dimension D, such that each paddle presents a relatively large face area to the terrain. The paddles are believed to act as external projections of the tire surface, e.g. like tire chains or relatively high land areas on the tire surface. It is known that tire chains or deeply grooved tire treads can somewhat increase tractive action in soft terrain. The illustrated paddles (with large face areas) should be helpful in further augmenting soft terrain performance.

Undercertain conditions very high load forces could be applied to paddles 40 (e.g. should a paddle encounter a rock or obstruction). To minimize damage to the wheel-tire assembly each paddle can be of breakaway design. As shown in FIG. 3 the paddle has notches 47 in its major surfaces. Should load forces be abnormally high the paddle will break at the notched area. If desired, the various hinge pins 42 could be designed as shear pins built to breakaway under abnormally high loads.

The primary aim of this invention is to provide the tires with protection against enemy small arms fire without interferring with normal flexural action of the tire. The tractive paddles are considered an add-on feature usable under certain conditions. It is believed that if pins 42 were made to be removable then paddles 40 could be used on an as-needed basis.

Figure 7:
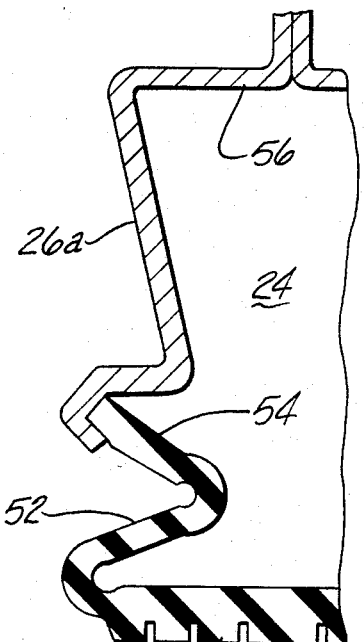
FIGS. 7 and 8 illustrate another variant of the invention.
Figure 8:
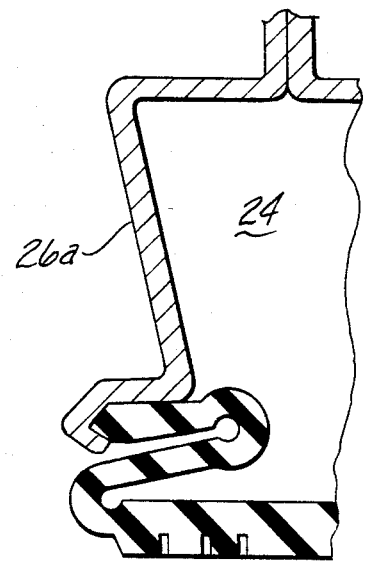

Preferably the tire is any standard tire; no special tire construction is believed necessary. However the invention could probably be used with special tire designs if such designs were otherwise considered advantageous; e.g. tires having run-flat features. FIGS. 7 and 8 show the invention applied to a tire of the folding sidewall type. In this case the tire is constructed generally similarly to tires shown in U.S. Pat. Nos. 3,347,300, and 3,394,751 and 3,400,746. FIG. 7 shows the tire in an unloaded condition, whereas FIG. 8 shows the tire in a fully loaded condition. The tire includes a tread wall 50, and hingedly connected sidewall sections 52 and 54. As each section of the tire engages the terrain that section of the tire changes from the FIG. 7 configuration to the FIG. 8 configuration.

The non-illustrated half of the tire-wheel cross-section is similar to the illustrated half. The wheel includes annular wall sections 26a extending radially outwardly from a cylindrical wall structure 56 located where the rim of the wheel would normally be. The aim is to provide a relatively large annular space 24 for pressurized air while still achieving protection against enemy small arms fire. Wall 26a (at the side of the wheel facing outwardly) would be formed of material resistant to penetration by bullets or projectile fragments.

Figure 9:
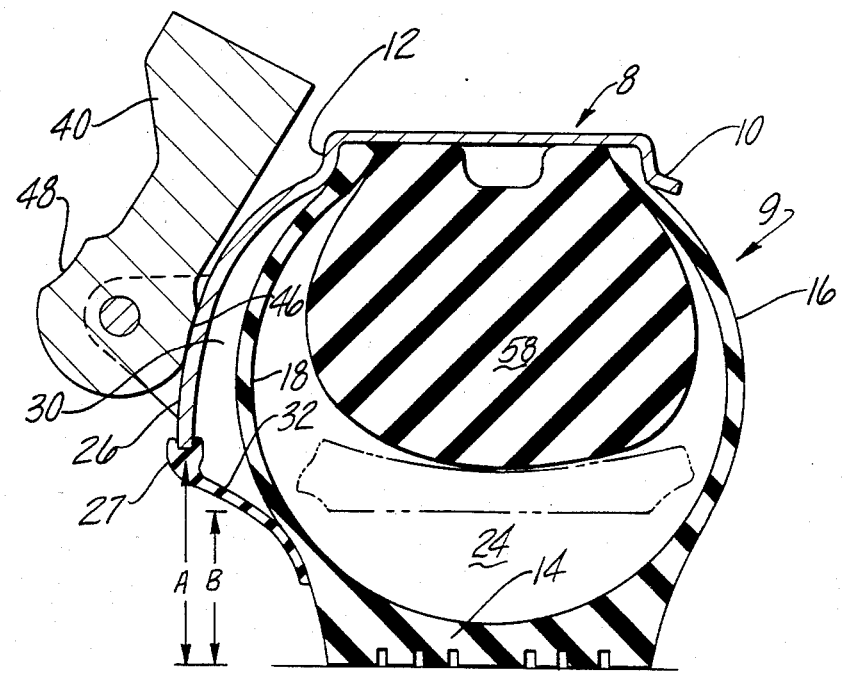
FIG. 9 illustrates an additional embodiment of the invention.

FIG. 9 illustrates an assembly that is similar to the FIG. 1 assembly except that the tire is equipped with an elastomeric insert 58 for providing a "get home" capability if the tire should be punctured, as for example from enemy fire, mine damage, etc. Insert 58 extends around the wheel 8 circumference in the space between the wheel rim and tread wall 14. Under normal conditions (with the tire fully inflated) insert 58 does not interfere with tire flexural action, except that during severe jounce conditions the tread wall 14 may impact the insert; in such a situation the insert acts like a semi-resilient bump stop to impart a progressively greater resistance against continued jounce (upward) motion of the tread wall. Should the tire be punctured (or deliberately depressurized preparatory to soft soil operations) insert 58 will act in place of normal air pressure; the wheel will run on insert 58 rather than on the rim, thus giving the vehicle a degree of mobility for getting out of soft soil or getting home intact. As regards soft soil operations, the tire deflation procedure could be used instead of the illustrated paddles 40 or in addition to the illustrated paddles.

FIG. 9 illustrates but one of several run flat tire constructions that can be used. Other representative run flat structures are shown in U.S. Pat. Nos. 2,986,189 and 4,212,339 and 4,216,809. The present invention is not concerned with run flat tires per se. Rather, my invention is concerned more particularly with the tire armor feature and auxiliary paddle feature.

It is realized that the proposed wheel designs do not provide complete armor protection for the tires. However it is believed that the illustrated designs are capable of being built to achieve at least a fifty percent protection level against enemy small arms fire from points on either side of the vehicle.

I wish it to be understood that I do not desire to be limited to the exact details of construction shown and described for obvious modifications will occur to a person skilled in the art, without departing from the spirit and scope of the appended claims.

I claim:

1. In a wheel-tire assembly for a military vehicle; the wheel having inboard and outboard flanges; the tire comprising a tread wall, spaced side walls, and bead areas fitting within the wheel flanges: the improvement comprising an imperforate rigid armor wall extending from the outboard flange of the wheel alongside the associated side wall of the tire; said armor wall having an outer circular peripheral edge (27) spaced radially inwardly from the plane of the tire tread wall by a distance (A) that is slightly more than the expected radial deflection (B) of the tread wall during service on the road and over rough terrain, whereby the armor wall will at all times remain out of contact with the road or terrain surface; said armor wall being formed of armor material resistant to penetration by small arms fire, whereby said armor wall partially protects the tire from puncture due to enemy small arms fire; said armor wall diverging a significant distance away from the adjacent tire side wall in radial directions measured from the wheel outboard flange to the tire tread wall; the divergence of the armor wall from the tire side wall being sufficient to define a free space (30) sized to accommodate normal lateral flexure of the tire side wall during service operations, whereby the armor wall has no restraining action on tire flexure; an annular flexible sealing strip (32) having one peripheral edge thereof secured to the aforementioned peripheral edge of the armor wall, and another peripheral edge thereof adhesively secured to the tire side wall at a point near the tire tread wall; said sealing strip being effective to preclude entrance of debris into the free space used to accommodate flexure of the tire side wall; a series of circumferentially-spaced paddles carried by the armor wall for engagement with soft terrain to minimize tire slippage; each paddle being located on a radial line measured from the wheel rotational axis; means (42) swingably mounting each paddle for pivotal motion in a radial plane normal to the direction of tire motion, whereby each paddle is adjustable between a retracted position within the armor wall rotational envelope, and an extended position projecting radially beyond the armor wall rotational envelope; each paddle having a width dimension (C) normal to the tire radial cross section, and a thickness dimension (D) parallel to the tire rotational plane; the width dimension of each paddle being significantly greater than the thickness dimension whereby each paddle presents a substantial face area to the terrain after tire sinkage into the terrain; each paddle being swingable from its retracted position to its extended position through an arc that is slightly greater than one hundred eighty degrees; edge areas (48) of each paddle being contoured to forcibly engage outer surface areas of the armor wall for releasably retaining the respective paddle in its retracted position or its extended position.

* * * * *